United States Patent [19]

Baratto et al.

[11] Patent Number: 4,704,163

[45] Date of Patent: Nov. 3, 1987

[54] PRINTING INK

[75] Inventors: Eugene L. Baratto; Donald J. David; Bernard S. Truskolaski; Maan-Shii S. Wu, all of St. Paul, Minn.

[73] Assignee: Minnesota Mining and Manufacturing Company, St. Paul, Minn.

[21] Appl. No.: 693,995

[22] Filed: Jan. 23, 1985

[51] Int. Cl.$^4$ .............................................. C08B 21/08
[52] U.S. Cl. ...................................... 106/20; 106/23; 428/352; 428/343; 525/218
[58] Field of Search ...................... 106/20, 21, 22, 23; 428/352, 343; 525/218

[56] References Cited

U.S. PATENT DOCUMENTS

| | | | |
|---|---|---|---|
| 2,532,011 | 11/1950 | Dahlquist et al. | 154/53.5 |
| 2,607,711 | 8/1952 | Hendricks | 117/122 |
| 3,318,852 | 5/1967 | Dixon | 260/78.5 |
| 3,673,135 | 6/1972 | Blake et al. | 260/17 A |
| 3,681,105 | 8/1972 | Milutin et al. | 117/15 |

FOREIGN PATENT DOCUMENTS 2140439 11/1984 United Kingdom.

OTHER PUBLICATIONS

Kodak Publication No. GN-350, Jul. 1983.
Kodak Publication No. GN-355, Nov. 1983.
Toyo Kasei Kogyo Co. Ltd., Hardlen Publication.

Primary Examiner—Paul Lieberman
Assistant Examiner—John F. McNally
Attorney, Agent, or Firm—Donald M. Sell; James A. Smith; David L. Weinstein

[57] ABSTRACT

Ink composition comprising a conventional flexographic ink stock, a low adhesion backsize compound, and, optionally, a chlorinated polyolefin. This ink composition can be used to print on webs, e.g. tapes, bearing a low adhesion backsize on one major surface thereof and a pressure-sensitive adhesive on the other major surface thereof.

7 Claims, No Drawings

PRINTING INK

BACKGROUND OF THE INVENTION

This invention relates to inks, and, more particularly inks that are useful for printing on low adhesion backsize coatings.

Pressure-sensitive adhesive webs are well-established articles of commerce. In the form of tapes of varying width they are used to perform many functions including joining, mending, masking, sealing, splicing, protecting, reiforcing, identifying and decorating. Webs of larger width are often employed as coverings for walls and the like. A common procedure in handling a pressure-sensitive adhesive web is to wind it in a roll with adjacent contact between adhesive-coated and adhesive-free sides, the web being unwound thereafter before use. In order to faciliate unwinding such a roll, the adhesive-free side of the web is usually coated with an appropriate "low adhesion" or release coating, often called a low adhesion backsize or LAB.

In many applications of pressure-sensitive adhesive webs, it is desirable to have a printed message or design on the adhesive-free side of the web. When some commonly available inks are used for such printing, a difficulty is encountered which arises from the tendency of the print to transfer to the adjacent adhesive-coated side when the web is unrolled, particularly if the printed web is retained in roll form for prolonged periods of time or at elevated temperatures. When other commonly available inks are used, the adhesion of ink to the adhesive-coated side frequently is so strong that the web breaks when an attempt is made to unroll it. This is particularly the case when highly aggressive adhesives are used. In some instances adhesive separates from the adhesive-coated side and transfers onto the print. When it is attempted to overcome the aforementioned deficiencies by reducing the adhesive level of the pressure-sensitive adhesive, the usefulness of the product is seriously limited to applications which require only low bond strength. For example, adhesive tapes intended for reinforcing, joining or splicing would not be satisfactory if made in this manner.

Attempts have been made to modify the ink by the addition of natural or synthetic waxy materials, but such procedures have been unsatisfactory because such additives tend to migrate into the adhesive layer and cause a variety of deficiencies such as detackification and loss in adhesive and cohesive strength.

Another approach has been to subject the printed web, before rewinding, to an additional coating with an appropriate release agent but this involves cumbersome modifications in printing machinery and increased manufacturing costs.

SUMMARY OF THE INVENTION

An ink for printing on the low adhesion backsize coating of a low adhesion backsize coated pressure-sensitive adhesive web has now been found which makes possible winding and unwinding the printed web in the usual manner without transfer of ink to the adjacent side. Briefly stated, the present invention comprises incorporating in a conventional flexographic ink composition an effective amount of a low adhesion backsize compound. Preferably, the ink of this invention contains per 100 weight percent of total composition: from about 10 to about 25 weight percent, and preferably from about 20 to about 25 weight percent, of a resinous binder; from about 3 to about 10 weight percent, and preferably from about 4 to about 6 weight percent, of a coloring agent which can be inorganic or organic; from about 1 to about 5 weight percent, and preferably from about 2 to about 3.5 weight percent, of a low adhesion backsize compound, and from about 40 to about 80 weight percent, and preferably from about 50 to about 70 weight percent, of a conventional solvent for flexographic ink. In another embodiment of the ink of this invention, an effective amount of chlorinated polyolefin, e.g. from about 3 to about 12 weight percent, preferably from about 4 to about 6 weight percent chlorinated polyolefin, can also be added to the ink. Additional ingredients such as conventional ink modifiers can also be added.

DETAILED DESCRIPTION OF THE INVENTION

Printing inks in general comprise coloring agents and liquid vehicles which comprise solutions of resinous binders in solvents. The specific choice of binders and solvents depends on several factors, such as, for example, the nature of the coloring agents and the nature of the substrate to be printed. The essence of the instant invention comprises incorporating into a conventional flexographic ink a low adhesion backsize compound. Low adhesion backsize compounds that can be used in the ink of the present invention are fully described in U.S. Pat. Nos. 2,607,711, 2,532,011, and 3,318,852, all of which patents are incorporated herein by reference. U.S. Pat. No. 2,607,711 describes low adhesion backsizes formed of a copolymer of an ester of the class consisting of higher alkyl acrylates and methacrylates wherein the higher alkyl radical has a length of at least 12 carbon atoms, and an acid of the class consisting of acrylic acid and methacrylic acid. The acrylic acid or methacrylic acid can be replaced in part by another copolymerizable ethylenic monomer, e.g., acrylonitrile or methacrylonitrile.

U.S. Pat. No. 3,318,852 describes low adhesion backsizes formed of a copolymer derived from an ethylenically unsaturated monomer containing a functional group forming a conjugated system with the ethylenic linkage wherein between about 10 and about 80 mole percent of the polymerized units of the copolymer contain a free carboxylic acid group as the functional group forming the conjugated system and all other functional groups forming the conjugated system are hydrolyzable to a free carboxyl acid group, and 20–90 percent by weight of monomeric units derived from an ethylenically unsaturated monomer containing a fluoroalkyl group of at least six carbon atoms. The solubility of the copolymer can be enhanced by the use of a third comonomer which also is an ethylenically unsaturated monomer containing a functional group which forms a conjugated system with its unsaturated bond and is hydrolyzable to a carboxyl group. Each of the monomers contributes to the overall properties of the copolymer depending to some extent upon the properties of each. An example is a terpolymer prepared by copolymerizing perfluoroctyl N-ethylsulfonamide methacrylate, octadecyl acrylate, and acrylic acid.

U.S. Pat. No. 2,532,011 describes a low adhesion backsize comprizing polyvinyl carbamate polymers wherein the carbamate side chains terminate with an alkyl group more than five carbon atoms in length, and preferably at least 14. These can be made by reacting together polyvinyl alcohol and an appropriate isocyanate having a terminal alkyl group. An example is polyvinyl N-octadecyl carbamate, made by reacting together polyvinyl alchol and octadecyl isocyanate, which has 18 carbon atoms in the nitrogen-bonded side chain alkyl groups.

It has also been discovered that the further addition of a chlorinated polyolefin to the ink of this invention provides an improvement with respect to ink anchorage for inks that are to be printed on substrates such as those described in assignee's U.S. Pat. No. 4,599,260, and incorporated herein by reference. Chlorinated polyolefins that are suitable for the composition of the present invention include chlorinated polyethylene, chlorinated polypropylene, chlorinated polybutylene, and mixtures thereof. Representative examples of commercially available chlorinated polyolefins that are suitable for the coposition of the present invention include Eastman® CP 343-1 available from Eastman Chemical Products, Inc. and "Hardlen" 13-LP available from Toyo Kasei Kogyo Co., Ltd.

When a mixture of additives is used, e.g., when both the low adhesion backsize compound and the chlorinated polyolefin are used, the individual additives can be added separately to the conventional ink stock composition, or, when convenient, said components can be mixed together before being added to the ink stock composition.

Solvent systems commonly employed in the manufacture of flexographic inks are lower aliphatic alcohols, including propanol, isopropanol, ethanol, and butanol; lower aliphatic esters, in particular ethyl acetate; and lower aliphatic ketones, in particular methyl ethyl ketone. Additional solvent systems for flexographic inks are described in Kirk-Othmer Encyclopedia of Chemical Technology, 3rd ed., Vol. 13, John Wiley & Sons, Inc. (New York: 1981), p. 387. The amount and type of solvent are regulated so as to give the ink the desired drying speed and degree of penetration.

Binders for ink vehicles are commonly selected from rosin esters, synthetic film-forming polymers, polyamides, alkyd resins and proteins, including casein, gelatin and soy protein. The choice of binder depends upon the particular substrate used, each type of fibrous or film material having specific requirements for optimum adhesion, as is known to those of ordinary skill in the art.

Coloring agents can be organic or inorganic. Representative examples of coloring agents include dyes and pigments. The choice of suitable coloring agents is known to those of ordinary skill in the art.

In addition to the above-mentioned chief components, flexographic inks customarily contain various amounts of modifying agents selected from waxes such as beeswax or paraffin wax, drying oils such as linseed oil, castor oil, turpentine oil, menhaden oil, or the salts of linoleic acid, oleostearic acid and the like with amines such as triethanolamine or hydroxypropylamine, as well as small quantities of so-called drier like cobalt resinate, cobalt linoleate, or an aluminum soap of linseed or tung oil. The use of such modifying agents is a well-established art.

A sufficient amount of low adhesion backsize compound must be incorporated in the ink stock composition to prevent ink pick-off by aggressive adhesives, such as for example, those adhesives described in U.S. Pat. No. 3,239,478 (incorporated herein by reference for the description of that adhesive), without adversely affecting the functional properties of the adhesive. Concentrations of low adhesion backsize greater than about 5 percent by weight are not preferred because most low adhesion backsize compounds are not readily soluble in conventional flexographic solvents.

Preferably, the concentration of ingredients of the ink composition is as follows:

| Ingredient | Amount (Percent by weight) | Preferred amount (Percent by weight) |
|---|---|---|
| Coloring agent | about 3 to about 10 | about 4 to about 6 |
| Resinous binder | about 10 to about 25 | about 20 to about 25 |
| Low adhesion backsize compound | about 1 to about 5 | about 2 to about 3.5 |
| Solvent | about 40 to about 80 | about 50 to about 70 |

The concentrations of coloring agent, resinous binder, and solvent can vary from the foregoing stated concentrations.

If incorporated in the ink stock composition, the concentration of chlorinated polyolefin preferably ranges from about 3 to about 12 percent by weight, more preferably from about 4 to about 6 percent by weight. If too great a concentration of chlorinated polyolefin is incorporated in the ink, the adhesive may pick ink off the backsize coating or adhesive may be transferred to the printed surface.

The ink composition of this invention is useful for printing on the low adhesion backsize coating of a low adhesion backsize coated pressure-sensitive adhesive web, e.g. a tape. The ink is particularly useful for printing on the backsize coating of the tape described in assignee's U.S. Pat. No. 4,599,260, incorporated herein by reference.

The flexographic inks in the following examples were prepared using the following conventional flexographic ink stock formulations, the amounts of each ingredient being expressed in percent by weight. The conventional ink stocks were "Flexotuf" Hard Black 84L0863 (hereinafter "Flexotuf" Hard Black) and "Flexotuf" Hard Bright Red 84L0706 (hereinafter "Flexotuf" Hard Bright Red), commercially available from Inmont Corporation. The composition of each ink stock was identical, with the sole exception being the nature of the pigment. The low adhesion backsize compound in Example 1 was prepared according to U.S. Pat. No. 3,318,852, and the low adhesion backsize compound in Examples 2, 3, 4, 5 was prepared according to U.S. Pat. No. 2,532,011.

INK STOCK FORMULATION

| Ingredient | Amount (percent by weight) |
|---|---|
| Binder (mixture of polyamide and nitrocellulose) | 29.5 |
| Pigment | 11.4 |
| Wax | 0.7 |
| Solvent (mixture of methanol, ethanol, isopropanol, n-propanol, ethyl acetate, n-propyl acetate) | 58.4 |

EXAMPLE 1

To 133 g of a low adhesion backsize solution (15% by weight of a terpolymer prepared from perfluorooctyl N-ethylsulfonamide methacrylate, octadecyl acrylate, and acrylic acid dissolved in a solvent containing 30 weight percent ethyl acetate, 9 weight percent t-butyl alcohol, 30 weight percent methyl ethyl ketone, 30 weight percent isopropyl alcohol) was added 267 g of "Flexotuf" Hard Bright Red. The resulting solution was stirred until it was homogenous.

EXAMPLE 2

To 60 g of a low adhesion backsize solution (5% by weight polyvinyl N-octadecyl carbamate dissolved in a solvent containing 20 weight percent xylene and 80 weight percent toluene) was added 240 g of "Flexotuf" Hard Black. The resulting solution was stirred until it was homogeneous.

EXAMPLE 3

To 120 g of a low adhesion backsize solution (5% by weight polyvinyl N-octadecyl carbamate dissolved in a solvent containing 20 weight percent xylene and 80 weight percent toluene) was added 180 g of "Flexotuf" Hard Black. The resulting solution was stirred until it was homogeneous.

EXAMPLE 4

To 285 g of "Flexotuf" Hard Black was added 15 g of solid polyvinyl N-octadecyl carbamate. The resulting mixture was ball-milled for 24 hours until a uniform dispersion had formed.

EXAMPLE 5

To a solution containing 48 g Eastman® CP 343-1 chlorinated polyolefin solution (12 g chlorinated polyolefin dissolved in 36 g of xylene) and 240 g of a low adhesion backsize solution (5% by weight polyvinyl N-octadecyl carbamate dissolved in a solvent containing 20 weight percent xylene and 80 weight percent toluene) was added 112 g of "Flexotuf" Hard Black. The resulting solution was stirred until it was homogeneous.

COMPARATIVE EXAMPLE A

"Flexotuf" Hard Black was used without any additional low adhesion backsize or chlorinated polyolefin added thereto.

The inks in Examples 1–5 and Comparative Example A were printed on the tape samples using a SIAT L3 flexographic printing apparatus. In each example the tape backing was 2.0 mil biaxially oriented polypropylene, one side of which was coated with a low adhesive backsize composition comprising polyvinyl N-octadecyl carbamate as described in U.S. Pat. No. 2,532,011 and chlorinated polyolefin (Eastman® CP 343-1 available from Eastman Chemical Products Inc.). The concentration of chlorinated polyolefin in the coating was 17 percent by weight and the concentration of polyvinyl N-octadecyl carbamate in the coating was 83 percent by weight. The side of each tape backing opposite the side bearing the low adhesion backsize coating was coated with a pressure-sensitive adhesive, namely, a conventional block copolymer system similar to those described in U.S. Pat. No. 3,239,478, incorporated herein by reference for the description of that adhesive. The pressure-sensitive adhesive was coated at a rate resulting in coating weights of 17 to 30 grams per square meter. The tapes were approximately 2 inches wide. This tape is fully described in assignee's U.S. Pat. No. 4,599,260.

The tapes were printed with a standard printing logo. The tape was run through the printing apparatus at a rate of 100 yards per minute. In each run, the tape was heated to approximately 200° F., at which temperature the low adhesion backsize coating was softened. The heated tape was then printed with the ink. The printed tapes were wound into rolls and retained for 11 days at 120° F. After aging, the tapes were unwound by hand at a rate consistent with normal tape applications.

The following tests were used to evaluate the ink of the present invention:

INK REMOVAL TEST

The printed indicia used in the test procedure covered 30 to 40 percent of the area of the tape backside.

The quantity of ink removed was determined subjectively by visual observation, and tapes exhibiting no more than about 5 percent ink removal by this test were considered acceptable.

UNWIND AND ADHESION TESTS OF PRINTED TAPE

Unwind forces were measured as the tape was unwound from the backsize-coated roll after printing. The adhesion test was performed by unwinding a roll of tape coated in accordance with the invention and applying a length of the tape to a polished steel surface followed by removal therefrom.

Both of these tests are described in detail in the Seventh Edition of "Test Methods For Pressure Sensitive Tapes", copyright 1976, Pressure Sensitive Tape Counsel, Glenview, Ill. The test for unwind force is designated PSTC-8, while the adhesion test is designated PSTC-1, in accordance with procedures outlined in the foregoing publication.

It is preferred for commercial purposes that unwind be 25 oz/in or lower. It is preferred that adhesion drop be 15% or lower.

The results of the foregoing tests are shown in Table I.

TABLE I

| | Properties | | | | |
|---|---|---|---|---|---|
| | Initially after printing | | 120° F. aged | | |
| Example | Unwind[1] | Ink transfer[2] | Unwind[1] | Ink transfer[2] | Percent drop in adhesion |
| 1 | high | none | high | none | 0 |
| 2 | high | low | high | low | 0 |
| 3 | medium | low | high | low | 0 |
| 4 | medium | none | medium | medium | 0 |
| 5 | medium | none | medium | none | 0 |
| A | medium | medium | medium | high | 0 |

[1]Low means 7 to 12 oz/in; medium means 13 to 18 oz/in; high means 18 to 25 oz/in.
[2]None means no ink transfer; slight means 0 to 2½% ink transfer; medium means 2½ to 5% ink transfer; high means greater than 5% ink transfer.

The data in the foregoing table show that the inks of the present invention provide good ink anchorage properties and satisfactory unwind properties, without affecting adhesion properties whatsoever.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Flexographic ink composition comprising from about 10 to about 25 weight percent resinous binder, from about 3 to about 10 weight percent coloring agent, from about 40 to about 80 weight percent solvent, and from about 1 to about 5 weight percent synthetic polymeric low adhesion backsize compound.

2. The composition of claim 1 further including from about 3 to about 12 weight percent chlorinated polyolefin.

3. The composition of claim 1 wherein said low adhesion backsize compound comprises from about 2 to about 3.5 weight percent of the composition.

4. The composition of claim 2 wherein said chlorinated polyolefin comprises from about 4 to about 6 weight percent of the composition.

5. The composition of claim 1 wherein said low adhesion backsize compound is selected from the group consisting of polyvinyl carbamate polymers wherein the carbamate side chains terminate with an alkyl group more than five carbon atoms in length, copolymers of an ester of the class consisting of higher alkyl acrylates and methacrylates wherein the higher alkyl radical has a length of at least 12 carbon atoms, and an acid of the class consisting of acrylic acid and methacrylic acid, copolymers derived from an ethylenically unsaturated monomer containing a functional group forming a conjugated system with the ethylenic linkage wherein between about 10 and about 80 mole percent of the polymerized units of the copolymer contain a free carboxylic acid group as the functional group forming the conjugated system and all other functional groups forming the conjugated system are hydrolyzable to a free carboxylic acid group, and 20 to 90 percent by weight of monomeric units derived from an ethylenically unsaturated monomer containing a fluoroalkyl group of at least 6 carbon atoms.

6. The composition of claim 1 wherein said resinous binder comprises from about 20 to about 25 weight percent of the composition, said coloring agent comprises from about 4 to about 6 weight percent of the composition, said solvent comprises from about 50 to about 70 weight percent of the composition, and said low adhesion backsize compound comprises from about 2 to about 3.5 weight percent of the composition.

7. The composition of claim 2 wherein said resinous binder comprises from about 20 to about 25 weight percent of the composition, said coloring agent comprises from about 4 to about 6 weight percent of the composition, said solvent comprises from about 50 to about 70 weight percent of the composition, said low adhesion backsize compound comprises from about 2 to about 3.5 weight percent of the composition, and said chlorinated polyolefin comprises from about 4 to about 6 weight percent of the composition.

* * * * *